US009953596B2

(12) United States Patent
Xiao

(10) Patent No.: US 9,953,596 B2
(45) Date of Patent: Apr. 24, 2018

(54) DISPLAY PANEL AND MANUFACTURING METHOD THEREOF, DISPLAY DEVICE

(71) Applicants: BOE Technology Group Co., Ltd., Beijing (CN); BEIJING BOE OPTOELECTRONICS TECHNOLOGY CO., LTD., Beijing (CN)

(72) Inventor: Ang Xiao, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 145 days.

(21) Appl. No.: 14/417,638

(22) PCT Filed: Jun. 30, 2014

(86) PCT No.: PCT/CN2014/081125
§ 371 (c)(1),
(2) Date: Jan. 27, 2015

(87) PCT Pub. No.: WO2015/058552
PCT Pub. Date: Apr. 30, 2015

(65) Prior Publication Data
US 2016/0005369 A1  Jan. 7, 2016

(30) Foreign Application Priority Data

Oct. 25, 2013 (CN) .......................... 2013 1 0513051

(51) Int. Cl.
*G09G 3/36* (2006.01)
*G02F 1/1333* (2006.01)

(52) U.S. Cl.
CPC ..... *G09G 3/3648* (2013.01); *G02F 1/133308* (2013.01); *G09G 3/3611* (2013.01);
(Continued)

(58) Field of Classification Search
CPC ... G02F 2001/133311; G02F 1/133308; G09G 3/3648; G09G 2300/0426; G09G 3/3611; G09G 2330/04
See application file for complete search history.

(56) References Cited

U.S. PATENT DOCUMENTS 5,706,069 A * 1/1998 Hermens .......... G02F 1/133351
349/153
2010/0225632 A1 9/2010 Ma et al.
(Continued)

FOREIGN PATENT DOCUMENTS

CN 101561591 A 10/2009
CN 101650499 A 2/2010
(Continued)

OTHER PUBLICATIONS

Jul. 3, 2015—(CN)—First Office Action for Appn 201310513051.X with Eng Tran.
(Continued)

*Primary Examiner* — Abhishek Sarma
(74) *Attorney, Agent, or Firm* — Banner & Witcoff, Ltd.

(57) ABSTRACT

A display panel, a manufacturing method thereof and a display device are provided. A dustproof construction is provided at a peripheral region of the display panel, and the dustproof construction is located on the outer side of the display region on the display panel, and on the inner side of an outer edge of a sealant applying region. The dustproof construction includes a first electrode, a second electrode and an insulating layer interposed between the first electrode and the second electrode; wherein, slits are arranged in the second electrode. With the display panel and manufacturing method thereof and the display device, impurity ions from
(Continued)

outside or in the sealant can be prevented from entering the display region, so that the peripheral badness of the display is improved.

14 Claims, 3 Drawing Sheets

(52) U.S. Cl.
CPC ............ *G02F 2001/133311* (2013.01); *G09G 2300/0426* (2013.01); *G09G 2330/04* (2013.01)

(56) References Cited

U.S. PATENT DOCUMENTS

2011/0048812 A1* 3/2011 Yilmaz .................. G06F 3/044
178/18.06

2012/0242944 A1 9/2012 Tsuchiya

FOREIGN PATENT DOCUMENTS

| | | |
|---|---|---|
| CN | 101825817 A | 9/2010 |
| CN | 202916561 U | 5/2013 |
| CN | 103135291 A | 6/2013 |
| CN | 103499904 A | 1/2014 |
| JP | 2012247663 A | 12/2012 |

OTHER PUBLICATIONS

International Search Report and Written Opinion dated Sep. 29, 2014 (PCT/CN2014/081125); ISA/CN.
Jan. 22, 2016—(CN)—Second Office Action Appn 201310513051.X with English Tran.
Apr. 26, 2016—International Preliminary Report on Patentability Appn PCTCN2014081125.

* cited by examiner

DISPLAY PANEL AND MANUFACTURING METHOD THEREOF, DISPLAY DEVICE

The application is a U.S. National Phase Entry of International Application No. PCT/CN2014/081125 filed on Jun. 30, 2014, designating the United States of America and claiming priority to Chinese Patent Application No. 201310513051.X filed on Oct. 25, 2013, 2014. The present application claims priority to and the benefit of the above-identified applications and the above-identified applications are incorporated by reference herein in their entirety.

TECHNICAL FIELD

Embodiments of the present invention relate to a display panel and a manufacturing method thereof, a display device.

BACKGROUND

A panel formation procedure is one step that is relatively important during manufacture of a liquid crystal display, and it is chiefly that, after an array substrate 10 and a color filter substrate 20 made by front-end procedures are subjected to an aligning treatment, position alignment and bonding, liquid crystals are injected. However, as illustrated in FIG. 1, in this procedure, liquid crystals at a peripheral display region 13 may often be polluted as a result of impurity ions 11 from outside or in a sealant 12 entering the peripheral display region 13, and peripheral badness of the liquid crystal display results from this very easily.

Modified methods available now are generally classified into two categories: firstly, in terms of process, the contact time of an uncured sealant with liquid crystals is decreased as far as possible, so as to alleviate the pollution caused by the fact that impurity ions in a sealant enter liquid crystals; secondly, in terms of material, a sealant that brings little pollution to liquid crystals and has a good barrier property to foreign impurities is developed, so as to lessen the circumjacent pollution. The inventors consider that the existing modified methods suffer from the following deficiencies. At first, at the present stage, contact of an uncured sealant with liquid crystals cannot be avoided with the technological level, and especially for small-size products, the contact is more difficult to be avoided. Secondly, the sealant material has a long developing cycle, and moreover, preponderant characteristics of the material in other aspects may also be sacrificed.

SUMMARY

According to an embodiment of the present invention, there is provided a display panel that comprises a display region and a peripheral region surrounding the display region, the peripheral region comprising a sealant applying region, wherein, a dustproof construction is provided at the peripheral region of the display panel, and the dustproof construction is located on an outer side of the display region and on an inner side of an outer edge of the sealant applying region; the dustproof construction comprises a first electrode, a second electrode and an insulating layer interposed between the first electrode and the second electrode; with the second electrode has slits arranged therein.

In an example, the display panel comprises an array substrate that comprises a pixel electrode and a common electrode; the first electrode and the pixel electrode are disposed in a same layer, the second electrode and the common electrode are disposed in a same layer; or, the first electrode and the common electrode are disposed in a same layer, the second electrode and the pixel electrode are disposed in a same layer.

In an example, the second electrode comprises a plurality of strip electrodes.

In an example, the strip electrodes each have a width in a range of 3 to 5 µm, and an interval between the strip electrodes that are adjacent is in a range of 5 to 7 µm.

In an example, the first electrode is a plate-like electrode.

In an example, the dustproof construction is apart from the display region at least 200 µm.

In an example, the dustproof construction has a distribution area overlapping with a part of the sealant applying region.

In an example, the dustproof construction is distributed within a range of being apart from the display region 200 to 300 µm and being apart from the outer edge of the sealant applying region 200 to 300 µm.

In an example, at the peripheral region of the display panel, there are further provided a first electric field control line and a second electric field control line that extend to a test connection region of the display panel; the first electrode and the second electrode are connected to the first electric field control line and the second electric field control line, respectively.

In an example, the first electrode has a thickness in a range of 400 to 600 angstroms.

In an example, the second electrode has a thickness in a range of 400 to 600 angstroms.

In an example, the insulating layer has a thickness in a range of 4000 to 6000 angstroms.

According to an embodiment of the invention, there is further provided a display device, comprising the display panel as stated by any item.

In another aspect, according to an embodiment of the invention, there is further provided a manufacturing method of a display panel, comprising fabricating a color filter substrate, fabricating an array substrate and cell-assembling the color filter substrate and the array substrate, wherein, fabricating the array substrate comprises:

forming a gate metal layer, a gate insulating layer, a source/drain metal layer and a passivation layer on a substrate in sequence;

forming a first transparent conductive film on the substrate with the gate metal layer, the gate insulating layer, the source/drain metal layer and the passivation layer formed thereon; and through a patterning process, forming a pixel electrode or a common electrode at a preset display region, and forming a first electrode on an outer side of the preset display region and on an inner side of an outer edge of a preset sealant applying region;

forming an insulating layer;

forming a second transparent conductive film; and through a patterning process, forming the common electrode or the pixel electrode at the display region, and meanwhile, forming a second electrode on the outer side of the display region and on the inner side of the outer edge of the preset sealant applying region, with slits arranged in the second electrode.

In an example, cell-assembling the color filter substrate and the array substrate comprises:

applying a drive voltage to the first electrode and the second electrode;

applying a sealant at edges of a color filter substrate or an array substrate, and performing cell-assembling;

removing the drive voltage, after the sealant is solidified completely.

With respect to the display panel and manufacturing method thereof and the display device provided by embodiments of the invention, a dustproof construction constituted by electrodes in two layers (the first and second electrodes) is provided on the periphery of the display panel, wherein slits are arranged in the second electrode located on top. A fringe electric field formed by the first electrode and the second electrode can act to bind the impurity ions from outside and inside the sealant in the slits of the second electrode, and it is prevented that these impurity ions enter into a display region and thus an abnormality in display results from it. Thus, the peripheral badness of the display is improved.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but not limitative of the invention.

DETAILED DESCRIPTION

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

Embodiment 1

Figure 1:
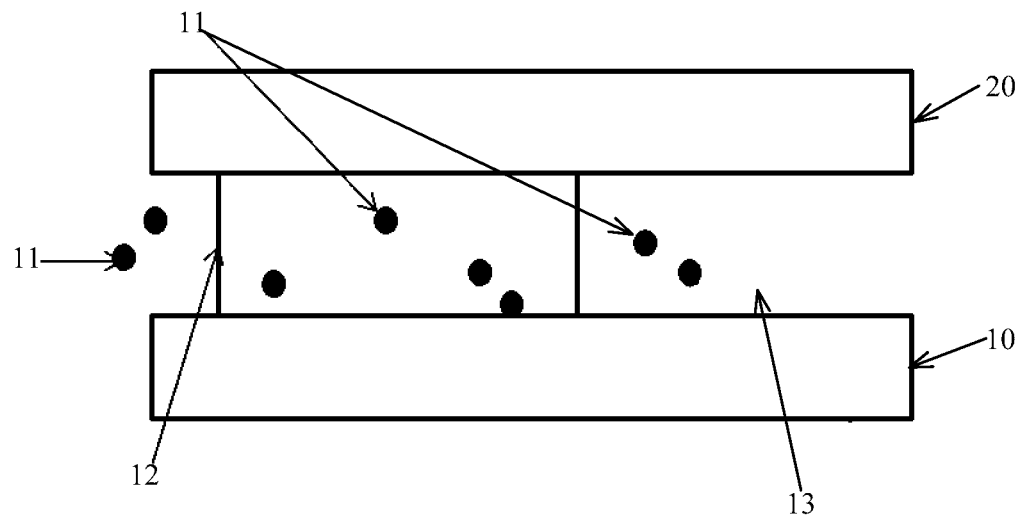
FIG. 1 is a schematic view illustrating entrance of impurity ions into a peripheral display region of a display panel in prior art.
Figure 2:
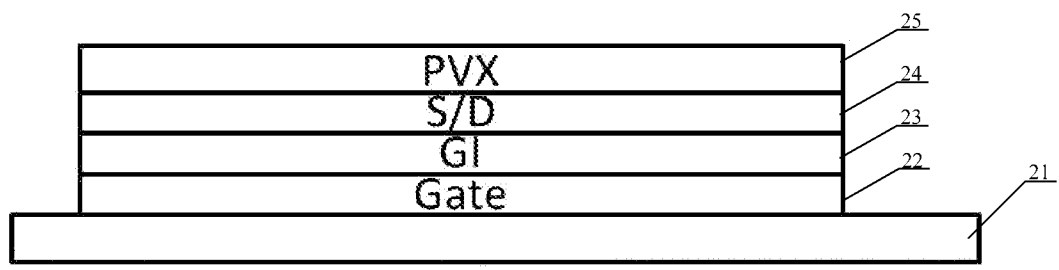
FIG. 2 is a structurally schematic view illustrating the periphery of a display panel.

For example, a sealant applying region on the periphery of a display product may be provided with a control switch for a peripheral circuit, and as illustrated in FIG. 2, its exemplified structure comprises a substrate 21, and a gate metal (Gate) layer 22, a gate insulating layer (GI) 23, a source/drain metal (S/D) layer 24 and a passivation layer (PVX) 25 located on the substrate 21 in sequence. The gate metal layer 22 and the source/drain metal layer 24 are communicated by connection of a gate-insulating-layer via hole (a GI via hole), so as to function as the control switch for the peripheral circuit.

According to an embodiment of the invention, there is provided a display panel. For example, the display panel comprises a display region and a peripheral region surrounding the display region, and the peripheral region comprises a sealant applying region. At the peripheral region of the display panel, there is provided a dustproof construction 30; the dustproof construction 30 is located on the outer side of the display region on the display panel, and on the inner side of an outer edge of the sealant applying region. Referring to that illustrated in FIG. 3, the dustproof construction 30 comprises a first electrode 26, a second electrode 28 and an insulating layer 27 interposed between the first electrode 26 and the second electrode 28. Slits are arranged in the second electrode 28.

A dustproof construction constituted by electrodes in two layers (the first and second electrodes) is provided on the periphery of the display panel in the embodiment. Upon a drive voltage being applied across the first electrode and the second electrode, impurity ions from outside or inside the sealant may gather in the slits of the second electrode along with an electric field, and it is prevented that they move freely into liquid crystals and thus an abnormality in peripheral display results from it. Please refer to FIG. 5 for its mechanism.

Figure 3:
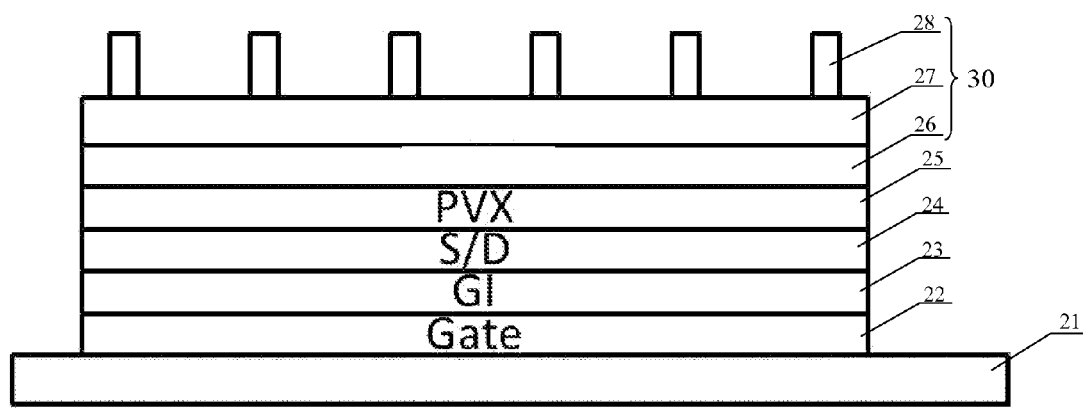
FIG. 3 is a structurally schematic view illustrating the periphery of a display panel provided by Embodiment 1 of the invention.

Slits are arranged in the second electrode 28 located on top, and there is no limit on the specific shape of slits. That illustrated in FIG. 3 is merely an exemplary structure of the embodiment, and specifically, the case is that the second electrode 28 comprises a plurality of strip electrodes. For example, the strip electrodes each have a width in the range of 3 to 5 μm, and the interval between the strip electrodes that are adjacent is in the range of 5 to 7 μm.

In accordance with specific requirements of the peripheral design, the first electrode 26 of the embodiment may adopt a layer-shaped or strip-shaped design. It is also possible that as illustrated in FIG. 3, the first electrode 26 is a plate-like electrode.

A fringe electric field is formed on the periphery of the display panel by the first electrode and the second electrode of the dustproof construction, and acts to tie down impurity ions from outside and inside the sealant, and then, it is prevented that these impurity ions enter the display region and bring about an abnormality in display. But at the same time, in order to avoid the fringe electric field from bringing an effect on liquid crystals within the display region close to the periphery of the display panel, the dustproof construction 30 should be apart from the display region at least 200 μm. On the other side of the dustproof construction, the distributional area of the dustproof construction may overlap with a part of the sealant applying region.

Figure 4:
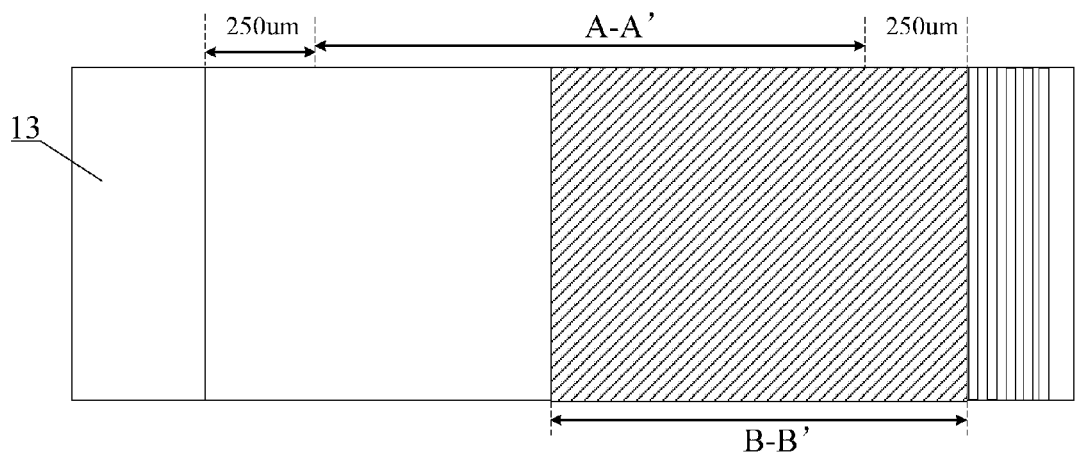
FIG. 4 is a first schematic view illustrating the distribution of a dustproof construction on the periphery of a display panel according to the Embodiment 1 of the invention.

For example, in an exemplary structure of the embodiment, the dustproof construction is distributed within a range of being apart from the display region 200 to 300 μm and being apart from an outer edge of the sealant applying region 200 to 300 μm. In some examples, the dustproof construction is distributed within a range of being apart from the display region 250 μm and being apart from an outer edge of the sealant applying region B-B' 250 μm, as denoted by region A-A' in FIG. 4.

Optionally, the first electrode 26 as stated above has a thickness in the range of 400 to 600 angstroms, the second electrode 28 has a thickness in the range of 400 to 600 angstroms, and the insulating layer 27 has a thickness in the range of 4000 to 6000 angstroms. For example, the first electrode 26 has a thickness of 400 angstroms, the second electrode 28 has a thickness of 600 angstroms, and the insulating layer 27 has a thickness of 5000 angstroms.

As for a liquid crystal display in a lateral field display mode, such as, an ADS (Advanced Super Dimension Switch) mode, or an IPS (In-Plane Switching) mode, because a pixel electrode and a common electrode of it are each disposed on an array substrate, the first electrode 26 and the second electrode 28 in the embodiment may be formed synchronously with the pixel electrode and the common electrode, respectively.

Figure 5:
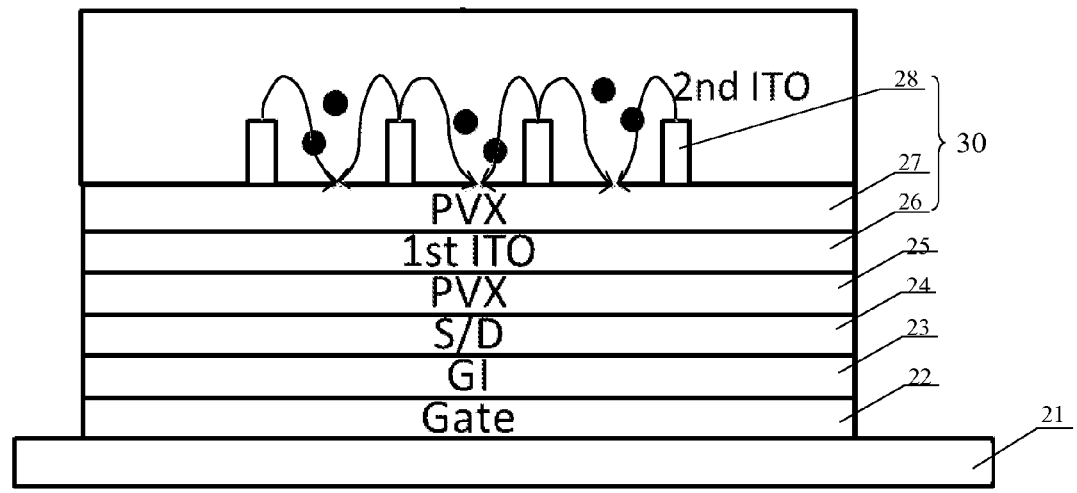
FIG. 5 is a schematic view illustrating the working mechanism of a dustproof construction on the periphery of a display panel according to the Embodiment 1 of the invention.

In some embodiments, the display panel comprises an array substrate, which comprises a pixel electrode and a common electrode. Upon the common electrode being on top and the pixel electrode is underneath, the first electrode 26 and the pixel electrode are disposed in the same layer, while the second electrode 28 and the common electrode are disposed in the same layer. Upon preparation, the first electrode 26 and the pixel electrode are formed synchronously by etching a first transparent conductive film (1st ITO), and the second electrode 28 and the common electrode are formed by etching a second transparent conductive film (2st ITO). Alternatively, upon the pixel electrode being on top and the common electrode is underneath, the first electrode 26 and the common electrode are disposed in the same layer, while the second electrode 28 and the pixel electrode are disposed in the same layer. Upon preparation, the first electrode 26 and the common electrode are formed by etching a first transparent conductive film (1st ITO), and the second electrode 28 and the pixel electrode are formed by etching a second transparent conductive film (2st ITO), as illustrated in FIG. 5. An insulating layer 27 is provided between the pixel electrode and the common electrode, and it may also be called as a second passivation layer (PVX).

The array substrate illustrated in FIG. 5 further comprises a gate metal (Gate) layer 22, a gate insulating layer (GI) 23, a source/drain metal (S/D) layer 24 and a passivation layer (PVX) 25 located on a substrate 21 sequentially.

The dustproof construction of the display panel as stated in the embodiment may be formed synchronously with a procedure substantially the same as that in prior art, without the necessity of adding a procedure additionally for the dustproof construction.

Figure 6:
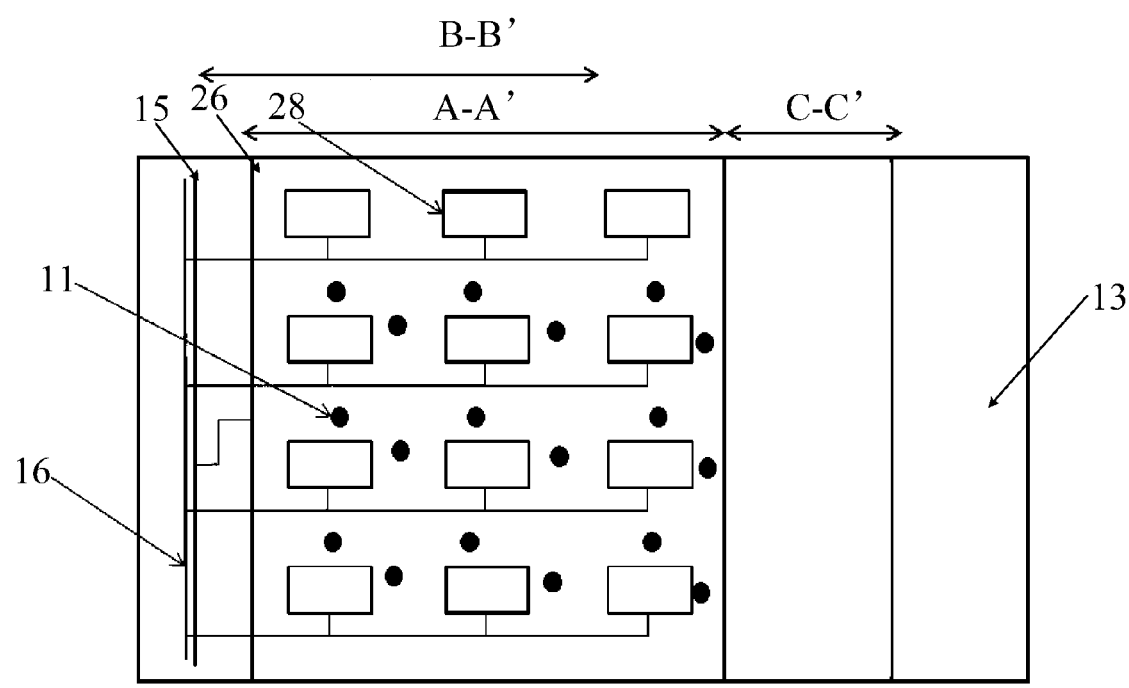
FIG. 6 is a second schematic view illustrating the distribution of a dustproof construction on the periphery of a display panel according to the Embodiment 1 of the invention.

A specific embodiment is illustrated in FIG. 6, and as denoted by A-A' in the figure, a dustproof construction is far away from a display region 13. Generally speaking, the distance from the dustproof construction to an edge of the display region 13, i.e., width of a region C-C' in which no electric field is arranged is ¼ to ⅙ of the width of a sealant applying region B-B' (namely, the glue width). Further, at a peripheral region of the display panel, there are further provided a first electric field control line 15 and a second electric field control line 16 that extend to a test connection region of the display panel. The first electrode 26 and the second electrode 28 are connected to the first electric field control line 15 and the second electric field control line 16 (collectively called as "electric field control lines"), respectively.

The first electrode 26 and the second electrode 28 are connected to the electric field control lines at the outer side, respectively, each of the electric field control lines on the periphery of the display panel is finally integrated into the test connection region (test pad region) of the array substrate, and switch is separately arranged independently from the other circuit. A drive voltage is applied across the first electrode 26 and the second electrode 28 by the first electric field control line 15 and the second electric field control line 16, so as to generate a fringe electric field for binding the impurity particles. The fringe electric field is applied before or after cell-assembling of substrates, and this can prevent small polar molecules in impurity from diffusing from the uncured sealant to liquid crystals. Only after the sealant is fully solidified, the fringe electric field can be removed.

It is to be noted that, when the screen is lit up and a normal display is performed on it, a fringe electric field generated by the dustproof construction should be maintained closed, so as not to produce interference to other circuit.

With respect to the display panel provided by embodiments of the invention, a dustproof construction constituted by electrodes in two layers (the first and second electrodes) is provided on the periphery of the display panel, so that impurity ions from outside and inside the sealant can be bound in slits of the second electrode. As such, it is prevented that these impurity ions enter into a display region and thus an abnormality in display results from it. Thus, the peripheral badness of the display is improved.

According to an embodiment of the invention, there is further provided a display device, which comprises any of the display panels as stated above. With the display panel, owing to provision of the dustproof construction, it can be prevented that impurity ions enter a display region and bring about an abnormality in display, so as to improve the peripheral badness of the display. Thus, a higher display quality can be achieved. The display device may be a liquid crystal panel, an electronic paper, an OLED panel, a cell phone, a tablet computer, a television, a display, a notebook computer, a digital photo frame, a navigator or any other product or component having a display function.

Embodiment 2

On the other hand, according to an embodiment of the invention, there is further provided a manufacturing method of a display panel, which comprises a color-filter-substrate process, an array-substrate process and a color-filter-substrate and array-substrate cell-assembling process. The array-substrate process comprises:

101, a gate metal layer, a gate insulating layer, a source/drain metal layer and a passivation layer are formed on a substrate in sequence;

102, a first transparent conductive film is formed on the substrate with the gate metal layer, the gate insulating layer, the source/drain metal layer and the passivation layer formed thereon, and through a patterning process, a pixel electrode or a common electrode is formed at a preset display region, and a first electrode is formed to be located on the outer side of the preset display region and on the inner side of an outer edge of a preset sealant applying region;

103, an insulating layer is formed;

104, a second transparent conductive film is formed, and through a patterning process, a common electrode or a pixel electrode is formed at the preset display region, and meanwhile, a second electrode with slits arranged therein is formed to be located on the outer side of the display region and on the inner side of an outer edge of the preset sealant applying region;

Upon the pixel electrode being formed by the first transparent conductive film, the common electrode is formed by the second transparent conductive film; upon the common electrode being formed by the first transparent conductive film, the pixel electrode is formed by the second transparent conductive film.

Referring to that illustrated in FIG. 5, in the embodiment, a gate metal layer, a gate insulating layer, a source/drain metal layer and a passivation layer (or an insulating layer) are formed sequentially on a substrate, and next, a 1st ITO (first transparent conductive film), an insulating layer and a 2nd ITO (second transparent conductive film) are fabricated on the passivation layer (details are as follows). Next, as for the structure that the common electrode is on top and the pixel electrode is underneath, a first transparent conductive film (1st ITO) is formed, and etched to form a first electrode 26 and a pixel electrode synchronously; an insulating layer 27 (may also be called as a second passivation layer PVX) is formed; and a second transparent conductive film (2nd ITO) is formed, and etched to form a second electrode 28 and a common electrode. While for the structure that the pixel electrode is on top and the common electrode is underneath, upon preparation, a first electrode 26 and a common electrode are formed by etching a first transparent conductive film (1st ITO), and a second electrode 28 and a pixel electrode are formed by etching a second transparent conductive film (2st ITO).

Further, the color-filter-substrate and array-substrate cell-assembling process comprises:

201, a drive voltage is applied across the first electrode and the second electrode;

202, a sealant is applied at edges of a color filter substrate or an array substrate, and a cell-assembling is performed;

203, after the sealant is solidified completely, the drive voltage is removed.

With the manufacturing method of the display panel provided with embodiments of the invention, without adding other process, a structure of electrodes in two levels is formed on the outer side of the sealant applying region, and a fringe electric field formed by the electrodes in two levels can act to bind up impurity ions from outside or inside the sealant in slits between the electrodes, so as to prevent these impurity ions from entering the display region and bringing about an abnormality in display.

Embodiments of the invention do not set a limit to the manner in which the first electrode, the insulating layer and the second electrode of the dustproof construction are formed, and it may be any manufacturing manner that is well-known by those skilled in the art.

For ease of clear illustration, "first", "second" and other words are used in the invention to distinguish categories of similar items, and there is no restriction in terms of number put on the present invention by the words "first" and "second", which are merely exemplarily illustrative of a preferred way. All similar variants or related expansions, as would be obvious to those skilled in the art based on the contents disclosed by the invention, fall into the protection scope of the invention.

Embodiments in the specification have each been described by using a progressive pattern, the same or similar portions between the embodiments can have a reference to each other, and key explanations of each embodiment are differences with other embodiments.

Descriptions made above are merely exemplary embodiments of the invention, but are not used to limit the protection scope of the invention. The protection scope of the invention is determined by attached claims.

This application claims the benefit of priority from Chinese patent application No. 201310513051.X, filed on Oct. 25, 2013, the disclosure of which is incorporated herein in its entirety by reference as a part of the present application.

The invention claimed is:

1. A display panel, comprising a display region and a peripheral region surrounding the display region, the peripheral region comprising a sealant applying region, wherein, a dustproof construction is provided at the peripheral region of the display panel, and the dustproof construction is located on an outer side of the display region and on an inner side of an outer edge of the sealant applying region;

the dustproof construction comprises a first electrode, a second electrode, and an insulating layer interposed between the first electrode and the second electrode, and the second electrode has a plurality of patterns disconnected from each other by slits arranged between the plurality of patterns;

in a direction perpendicular to the display panel, the dustproof construction and the sealant applying region are at least partially overlapped with each other, and both the first electrode and the second electrode are at least partially overlapped with the sealant applying region;

the display panel comprises an array substrate that comprises a pixel electrode and a common electrode, and the pixel electrode and the common electrode are disposed in the display region; and the first electrode and the pixel electrode are disposed in a same layer, the second electrode and the common electrode are disposed in a same layer; or, the first electrode and the common electrode are disposed in a same layer, the second electrode and the pixel electrode are disposed in a same layer.

2. The display panel according to claim 1, wherein the plurality of patterns comprise a plurality of strip electrodes.

3. The display panel according to claim 2, wherein each of the strip electrodes has a width in a range of 3 to 5 μm, and an interval between two adjacent strip electrodes is in a range of 5 to 7 μm.

4. The display panel according to claim 1, wherein the first electrode is a plate-like electrode.

5. The display panel according to claim 1, wherein the dustproof construction is apart from the display region by at least 200 μm.

6. The display panel according to claim 1, wherein the dustproof construction has a distribution area overlapping with a part of the sealant applying region.

7. The display panel according to claim 6, wherein the dustproof construction is distributed within a range of being apart from the display region 200 to 300 μm and being apart from the outer edge of the sealant applying region 200 to 300 μm.

8. The display panel according to claim 1, further comprising, at the peripheral region of the display panel, a first electric field control line and a second electric field control line that extend to a test connection region of the display panel, the first electrode and the second electrode being connected to the first electric field control line and the second electric field control line, respectively.

9. The display panel according to claim 1, wherein the first electrode has a thickness in a range of 400 to 600 angstroms.

10. The display panel according to claim 1, wherein the second electrode has a thickness in a range of 400 to 600 angstroms.

11. The display panel according to claim 1, wherein the insulating layer has a thickness in a range of 4000 to 6000 angstroms.

12. A display device, comprising the display panel according to claim 1.

13. A manufacturing method of a display panel, comprising fabricating a color filter substrate, fabricating an array substrate, and cell-assembling the color filter substrate and the array substrate, wherein, fabricating the array substrate comprises:

forming a gate metal layer, a gate insulating layer, a source/drain metal layer, and a passivation layer on a substrate in sequence;

forming a first transparent conductive film on the substrate with the gate metal layer, the gate insulating layer, the source/drain metal layer, and the passivation layer formed thereon;

through a first patterning process, forming a pixel electrode or a common electrode at a preset display region, and forming a first electrode on an outer side of the preset display region and on an inner side of an outer edge of a preset sealant applying region;

forming an insulating layer;

forming a second transparent conductive film; and through a second patterning process, forming the common electrode or the pixel electrode at the preset display region, and forming a second electrode on the outer side of the preset display region and on the inner side of the outer edge of the preset sealant applying region, the second electrode comprising a plurality of patterns disconnected with each other by slits arranged between the plurality of patterns, wherein, in a direction perpendicular to the display panel, a dustproof construction, which comprises the first electrode, the insulating layer, and the second electrode, and the sealant applying region are at least partially overlapped with each other, and both the first electrode and the second electrode are at least partially overlapped with the sealant applying region.

14. The method according to claim 13, wherein the cell-assembling the color filter substrate and the array substrate comprises:

applying a drive voltage to the first electrode and the second electrode;

applying a sealant at edges of a color filter substrate or an array substrate, and performing cell-assembling; and removing the drive voltage, after the sealant is solidified completely.

* * * * *